(12) United States Patent
Artes et al.

(10) Patent No.: US 11,789,447 B2
(45) Date of Patent: Oct. 17, 2023

(54) REMOTE CONTROL OF AN AUTONOMOUS MOBILE ROBOT

(71) Applicant: RobArt GmbH, Linz (AT)

(72) Inventors: Harold Artes, Linz (AT); Reinhard Berlach, Linz (AT); Erwin Mascher, Linz (AT); Reinhard Vogel, Linz (AT)

(73) Assignee: RobArt GmbH, Linz (AT)

( * ) Notice: Subject to any disclaimer, the term of this patent is extended or adjusted under 35 U.S.C. 154(b) by 0 days.

(21) Appl. No.: 16/005,013

(22) Filed: Jun. 11, 2018

(65) Prior Publication Data

US 2018/0292827 A1 Oct. 11, 2018

Related U.S. Application Data

(63) Continuation-in-part of application No. PCT/EP2016/080235, filed on Dec. 8, 2016.

(30) Foreign Application Priority Data

Dec. 11, 2015 (DE) ............ 10 2015 121 666.3

(51) Int. Cl.
*G05D 1/00* (2006.01)
*B25J 9/16* (2006.01)
(Continued)

(52) U.S. Cl.
CPC ......... *G05D 1/0088* (2013.01); *B25J 9/1664* (2013.01); *G01C 21/362* (2013.01);
(Continued)

(58) Field of Classification Search
CPC .......... B25J 9/16; B25J 9/1664; G01C 21/36; G01C 21/362; G05D 1/0022;
(Continued)

(56) References Cited

U.S. PATENT DOCUMENTS 4,674,048 A 6/1987 Okumura
4,740,676 A 4/1988 Satoh et al.
(Continued)

FOREIGN PATENT DOCUMENTS

AU 2015322263 4/2017
CA 2322419 9/1999
(Continued)

OTHER PUBLICATIONS

English Translation for reference KR20070045641A, (Year: 2007).*
(Continued)

*Primary Examiner* — Rachid Bendidi
(74) *Attorney, Agent, or Firm* — Akerman LLP; Peter A. Chiabotti

(57) ABSTRACT

A system comprising at least one autonomous mobile robot (service robot) and at least one mobile terminal for controlling the robot. According to one embodiment of the disclosure, the robot and the mobile terminal are designed to communicate via at least a first wireless connection. The robot is designed to detect information regarding the location of a user (e.g. on the basis of the location of the terminal) and to decide as a function of the detected information regarding the location whether and, if yes, which information is sent to the mobile terminal and/or whether and, if yes, which actions are carried out, interrupted, continued or terminated by the robot.

19 Claims, 7 Drawing Sheets

(51) Int. Cl.
    *G01C 21/36* (2006.01)
    *G05D 1/02* (2020.01)
(52) U.S. Cl.
    CPC ......... *G05D 1/0022* (2013.01); *G05D 1/0212* (2013.01); *G05D 2201/0203* (2013.01); *G05D 2201/0208* (2013.01)
(58) Field of Classification Search
    CPC ............... G05D 1/0212; G05D 1/0088; G05D 2201/0203; G05D 2201/0208
    See application file for complete search history.

(56) References Cited

U.S. PATENT DOCUMENTS

| | | | |
|---|---|---|---|
| 4,777,416 A | 10/1988 | George, II et al. | |
| 5,109,566 A | 5/1992 | Kobayashi et al. | |
| 5,260,710 A | 11/1993 | Omamyuda et al. | |
| 5,284,522 A | 2/1994 | Kobayashi et al. | |
| 5,377,106 A | 12/1994 | Drunk et al. | |
| 5,402,051 A | 3/1995 | Fujiwara et al. | |
| 5,696,675 A | 12/1997 | Nakamura et al. | |
| 5,787,545 A | 8/1998 | Colens | |
| 5,995,884 A | 11/1999 | Allen et al. | |
| 6,389,329 B1 | 5/2002 | Colens | |
| 6,532,404 B2 | 3/2003 | Colens | |
| 6,594,844 B2 | 7/2003 | Jones | |
| 6,605,156 B1 | 8/2003 | Clark et al. | |
| 6,615,108 B1 | 9/2003 | Peless et al. | |
| 6,667,592 B2 | 12/2003 | Jacobs et al. | |
| 6,690,134 B1 | 2/2004 | Jones et al. | |
| 6,764,373 B1 | 7/2004 | Osawa et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 6,972,834 B1 | 12/2005 | Oka et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,302,345 B2 | 11/2007 | Kwon et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,483,151 B2 | 1/2009 | Zganec et al. | |
| 7,507,948 B2 | 3/2009 | Park et al. | |
| 7,539,557 B2 | 5/2009 | Yamauchi | |
| 7,571,511 B2 | 8/2009 | Jones et al. | |
| 7,636,982 B2 | 12/2009 | Jones et al. | |
| 7,656,541 B2 | 2/2010 | Waslowski et al. | |
| 7,761,954 B2 | 7/2010 | Ziegler et al. | |
| 7,801,676 B2 | 9/2010 | Kurosawa et al. | |
| 8,438,695 B2 | 5/2013 | Gilbert et al. | |
| 8,594,019 B2* | 11/2013 | Misumi | H04W 76/15 370/328 |
| 8,739,355 B2 | 6/2014 | Morse et al. | |
| 8,843,245 B2 | 9/2014 | Choe et al. | |
| 8,855,914 B1 | 10/2014 | Alexander et al. | |
| 8,892,251 B1 | 11/2014 | Dooley et al. | |
| 8,921,752 B2 | 12/2014 | Iizuka | |
| 8,982,217 B1 | 3/2015 | Hickman | |
| 9,002,511 B1 | 4/2015 | Hickerson et al. | |
| 9,026,302 B2 | 5/2015 | Stout et al. | |
| 9,037,294 B2 | 5/2015 | Chung et al. | |
| 9,043,017 B2 | 5/2015 | Jung et al. | |
| 9,149,170 B2 | 10/2015 | Ozick et al. | |
| 9,220,386 B2 | 12/2015 | Gilbert, Jr. et al. | |
| 9,486,924 B2 | 11/2016 | Dubrovsky et al. | |
| 9,717,387 B1 | 8/2017 | Szatmary et al. | |
| 10,228,697 B2 | 3/2019 | Yoshino | |
| 2002/0016649 A1 | 2/2002 | Jones | |
| 2002/0103575 A1 | 8/2002 | Sugawara | |
| 2002/0120364 A1 | 8/2002 | Colens | |
| 2003/0025472 A1 | 2/2003 | Jones et al. | |
| 2003/0030398 A1 | 2/2003 | Jacobs et al. | |
| 2003/0120389 A1 | 6/2003 | Abramson et al. | |
| 2003/0142925 A1 | 7/2003 | Melchior et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0000543 A1 | 1/2005 | Taylor et al. | |
| 2005/0010331 A1 | 1/2005 | Taylor et al. | |
| 2005/0041839 A1 | 2/2005 | Saitou et al. | |
| 2005/0067994 A1 | 3/2005 | Jones et al. | |
| 2005/0156562 A1 | 7/2005 | Cohen et al. | |
| 2005/0171636 A1 | 8/2005 | Tani | |
| 2005/0171644 A1 | 8/2005 | Tani | |
| 2005/0204717 A1 | 9/2005 | Colens | |
| 2005/0212680 A1 | 9/2005 | Uehigashi | |
| 2005/0256610 A1 | 11/2005 | Orita | |
| 2006/0012493 A1 | 1/2006 | Karlsson et al. | |
| 2006/0020369 A1 | 1/2006 | Taylor | |
| 2006/0095158 A1 | 5/2006 | Lee et al. | |
| 2006/0237634 A1 | 10/2006 | Kim | |
| 2007/0027579 A1 | 2/2007 | Suzuki et al. | |
| 2007/0061041 A1 | 3/2007 | Zweig | |
| 2007/0234492 A1 | 10/2007 | Svendsen et al. | |
| 2007/0266508 A1 | 11/2007 | Jones et al. | |
| 2007/0282484 A1 | 12/2007 | Chung et al. | |
| 2008/0046125 A1 | 2/2008 | Myeong et al. | |
| 2008/0140255 A1 | 6/2008 | Ziegler et al. | |
| 2008/0155768 A1 | 7/2008 | Ziegler et al. | |
| 2008/0192256 A1 | 8/2008 | Wolf et al. | |
| 2008/0307590 A1 | 12/2008 | Jones et al. | |
| 2009/0048727 A1 | 2/2009 | Hong et al. | |
| 2009/0051921 A1 | 2/2009 | Masahiko | |
| 2009/0100129 A1* | 4/2009 | Vigil | G06F 3/04886 709/203 |
| 2009/0177320 A1 | 7/2009 | Lee et al. | |
| 2009/0182464 A1 | 7/2009 | Myeong et al. | |
| 2009/0281661 A1 | 11/2009 | Dooley et al. | |
| 2010/0030380 A1 | 2/2010 | Shah et al. | |
| 2010/0049365 A1 | 2/2010 | Jones et al. | |
| 2010/0082193 A1 | 4/2010 | Chiappetta | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0324731 A1 | 12/2010 | Letsky | |
| 2010/0324736 A1 | 12/2010 | Yoo et al. | |
| 2011/0054689 A1 | 3/2011 | Nielsen et al. | |
| 2011/0137461 A1 | 6/2011 | Kong et al. | |
| 2011/0194755 A1 | 8/2011 | Jeong et al. | |
| 2011/0211731 A1 | 9/2011 | Lee et al. | |
| 2011/0224824 A1 | 9/2011 | Lee et al. | |
| 2011/0236026 A1 | 9/2011 | Yoo et al. | |
| 2011/0238214 A1 | 9/2011 | Yoo et al. | |
| 2011/0264305 A1 | 10/2011 | Choe et al. | |
| 2011/0278082 A1 | 11/2011 | Chung et al. | |
| 2011/0295420 A1 | 12/2011 | Wagner | |
| 2012/0008128 A1 | 1/2012 | Bamji | |
| 2012/0013907 A1 | 1/2012 | Jung et al. | |
| 2012/0022785 A1 | 1/2012 | DiBernardo et al. | |
| 2012/0060320 A1 | 3/2012 | Lee et al. | |
| 2012/0069457 A1 | 3/2012 | Wolf et al. | |
| 2012/0169497 A1 | 7/2012 | Schnittman et al. | |
| 2012/0173070 A1 | 7/2012 | Schnittman | |
| 2012/0215380 A1 | 8/2012 | Fouillade et al. | |
| 2012/0223216 A1 | 9/2012 | Flaherty et al. | |
| 2012/0265370 A1 | 10/2012 | Kim et al. | |
| 2012/0271502 A1 | 10/2012 | Lee et al. | |
| 2012/0283905 A1 | 11/2012 | Nakano et al. | |
| 2013/0001398 A1 | 1/2013 | Wada et al. | |
| 2013/0024025 A1 | 1/2013 | Hsu | |
| 2013/0166134 A1 | 6/2013 | Shitamoto et al. | |
| 2013/0206177 A1 | 8/2013 | Burlutskiy | |
| 2013/0217421 A1* | 8/2013 | Kim | H04B 1/38 455/456.3 |
| 2013/0221908 A1 | 8/2013 | Tang | |
| 2013/0261867 A1 | 10/2013 | Burnett et al. | |
| 2013/0265562 A1 | 10/2013 | Tang et al. | |
| 2013/0317944 A1 | 11/2013 | Huang et al. | |
| 2014/0005933 A1 | 1/2014 | Fong et al. | |
| 2014/0098218 A1 | 4/2014 | Wu et al. | |
| 2014/0100693 A1 | 4/2014 | Fong et al. | |

(56) References Cited

U.S. PATENT DOCUMENTS

| | | | |
|---|---|---|---|
| 2014/0115797 A1 | 5/2014 | Duenne | |
| 2014/0124004 A1 | 5/2014 | Rosenstein et al. | |
| 2014/0128093 A1 | 5/2014 | Das et al. | |
| 2014/0156125 A1 | 6/2014 | Song et al. | |
| 2014/0207280 A1 | 7/2014 | Duffley et al. | |
| 2014/0207281 A1 | 7/2014 | Angle et al. | |
| 2014/0207282 A1* | 7/2014 | Angle | G06F 15/16 700/257 |
| 2014/0218517 A1* | 8/2014 | Kim | H04N 7/181 348/143 |
| 2014/0257563 A1 | 9/2014 | Park et al. | |
| 2014/0257564 A1 | 9/2014 | Sun et al. | |
| 2014/0257565 A1 | 9/2014 | Sun et al. | |
| 2014/0303775 A1 | 10/2014 | Oh et al. | |
| 2014/0316636 A1 | 10/2014 | Hong et al. | |
| 2014/0324270 A1 | 10/2014 | Chan et al. | |
| 2014/0343783 A1 | 11/2014 | Lee | |
| 2015/0115138 A1 | 4/2015 | Heng et al. | |
| 2015/0115876 A1 | 4/2015 | Noh et al. | |
| 2015/0120056 A1 | 4/2015 | Noh et al. | |
| 2015/0151646 A1 | 6/2015 | Noiri | |
| 2015/0168954 A1 | 6/2015 | Hickerson et al. | |
| 2015/0173578 A1 | 6/2015 | Kim et al. | |
| 2015/0202772 A1 | 7/2015 | Kim | |
| 2015/0212520 A1* | 7/2015 | Artes | G05D 1/0022 701/2 |
| 2015/0223659 A1 | 8/2015 | Han et al. | |
| 2015/0260829 A1 | 9/2015 | Wada | |
| 2015/0265125 A1 | 9/2015 | Lee et al. | |
| 2015/0269823 A1* | 9/2015 | Yamanishi | G08B 21/02 340/539.11 |
| 2015/0314453 A1 | 11/2015 | Witelson et al. | |
| 2015/0367513 A1 | 12/2015 | Gettings et al. | |
| 2016/0008982 A1 | 1/2016 | Artes et al. | |
| 2016/0037983 A1 | 2/2016 | Hillen et al. | |
| 2016/0041029 A1 | 2/2016 | T'ng et al. | |
| 2016/0066759 A1 | 3/2016 | Langhammer et al. | |
| 2016/0103451 A1 | 4/2016 | Vicenti | |
| 2016/0123618 A1* | 5/2016 | Hester | F24F 11/62 700/276 |
| 2016/0132056 A1 | 5/2016 | Yoshino | |
| 2016/0150933 A1 | 6/2016 | Duenne et al. | |
| 2016/0165795 A1 | 6/2016 | Balutis et al. | |
| 2016/0166126 A1 | 6/2016 | Morin et al. | |
| 2016/0200161 A1 | 7/2016 | Van Den Bossche et al. | |
| 2016/0209217 A1 | 7/2016 | Babu et al. | |
| 2016/0213218 A1 | 7/2016 | Ham et al. | |
| 2016/0229060 A1 | 8/2016 | Kim et al. | |
| 2016/0271795 A1 | 9/2016 | Vicenti | |
| 2016/0278090 A1* | 9/2016 | Moeller | H04L 63/1458 |
| 2016/0282873 A1 | 9/2016 | Masaki et al. | |
| 2016/0297072 A1 | 10/2016 | Williams et al. | |
| 2016/0298970 A1 | 10/2016 | Lindhe et al. | |
| 2017/0000307 A1* | 1/2017 | Choi | H04B 17/27 |
| 2017/0001311 A1 | 1/2017 | Bushman et al. | |
| 2017/0083022 A1 | 3/2017 | Tang | |
| 2017/0147000 A1 | 5/2017 | Hoennige et al. | |
| 2017/0177001 A1 | 6/2017 | Cao et al. | |
| 2017/0197314 A1 | 7/2017 | Stout et al. | |
| 2017/0231452 A1 | 8/2017 | Saito et al. | |
| 2017/0364087 A1 | 12/2017 | Tang et al. | |

FOREIGN PATENT DOCUMENTS

| | | |
|---|---|---|
| CN | 1381340 | 11/2002 |
| CN | 1696612 | 11/2005 |
| CN | 101945325 | 1/2011 |
| CN | 101972129 | 2/2011 |
| CN | 102407522 | 4/2012 |
| CN | 102738862 | 10/2012 |
| CN | 203672362 | 6/2014 |
| CN | 104460663 | 3/2015 |
| CN | 104634601 | 5/2015 |
| CN | 104765362 | 7/2015 |
| CN | 105045098 | 11/2015 |
| CN | 105334847 | 2/2016 |
| CN | 105467398 | 4/2016 |
| CN | 105527619 | 4/2016 |
| CN | 105990876 | 10/2016 |
| DE | 4421805 | 8/1995 |
| DE | 10204223 | 8/2003 |
| DE | 10261787 | 1/2004 |
| DE | 60002209 | 3/2004 |
| DE | 69913150 | 8/2004 |
| DE | 102007016802 | 5/2008 |
| DE | 102008028931 | 6/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102010033768 | 2/2012 |
| DE | 102011050357 | 2/2012 |
| DE | 102012201870 | 8/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 202014100346 | 3/2014 |
| DE | 102012112035 | 6/2014 |
| DE | 102012112036 | 6/2014 |
| DE | 102013100192 | 7/2014 |
| DE | 102014110265 | 7/2014 |
| DE | 102014113040 | 9/2014 |
| DE | 102013104399 | 10/2014 |
| DE | 102013104547 | 11/2014 |
| DE | 102015006014 | 5/2015 |
| DE | 102014012811 | 10/2015 |
| DE | 102015119501 | 11/2015 |
| DE | 102014110104 | 1/2016 |
| DE | 102016102644 | 2/2016 |
| DE | 102016114594 | 2/2018 |
| DE | 102016125319 | 6/2018 |
| EP | 0142594 | 5/1985 |
| EP | 0402764 | 12/1990 |
| EP | 0769923 | 5/1997 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2498158 | 9/2012 |
| EP | 2502539 | 9/2012 |
| EP | 2511782 | 10/2012 |
| EP | 2515196 | 10/2012 |
| EP | 2573639 | 3/2013 |
| EP | 2595024 | 5/2013 |
| EP | 2740013 | 6/2014 |
| EP | 2741159 | 6/2014 |
| EP | 2853976 | 4/2015 |
| EP | 2870852 | 5/2015 |
| EP | 3079030 | 11/2015 |
| EP | 3156873 | 4/2017 |
| EP | 3184013 | 6/2017 |
| EP | 2381328 | 6/2021 |

(56) References Cited

FOREIGN PATENT DOCUMENTS

| | | |
|---|---|---|
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2003330543 | 11/2003 |
| JP | 2004133882 | 4/2004 |
| JP | 2005205028 | 8/2005 |
| JP | 2009238055 | 10/2009 |
| JP | 2010219736 A * | 9/2010 |
| JP | 2010227894 | 10/2010 |
| JP | 2011-233149 | 11/2011 |
| JP | 2013146302 | 8/2013 |
| JP | 2014176260 | 9/2014 |
| JP | 201541203 | 3/2015 |
| KR | 20070045641 A * | 5/2007 |
| KR | 100735565 | 7/2007 |
| KR | 100815545 | 3/2008 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20170004343 A * | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | 2007028667 | 3/2007 |
| WO | 2012099694 | 7/2012 |
| WO | 2012157951 | 11/2012 |
| WO | 2014017256 | 1/2014 |
| WO | 2014043732 | 3/2014 |
| WO | 2014055966 | 4/2014 |
| WO | 2014/113091 | 7/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

English translation KR20170004343A (Year: 2015).*
English translation JP2010219736 (Year: 2010).*
Konolige et al., "A Low-Cost Laser Distance Sensor," 2008 IEEE International Conference on Robotics and Automation, Pasadena, CA, USA, May 19-23, 2008, document of 7 pages.
Oh et al., "Autonomous Battery Recharging for Indoor Mobile Robots," Massachusetts Institute of Technology Press, Aug. 30, 2000, document of 6 pages, XP055321836.
Siegwart, "Introduction to Autonomous Mobile Robots", Massachusetts, ISBN 978-0-26-219502-7, (2004), pp. 104-115, 151-163, 250-251, document of 37 pages. http://www.robotee.com/EBooks/Introduction_to_Autonomous_Mobile_Robots.pdf, XP055054850.
Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages. http://dx.doi.org/10.1145/2737095.27.
Patent Cooperation Treaty, "International Search Report" and English translation thereof, issued in International Application No. PCT/EP2016/080235, by Examiner Patrick Kielhöfer, document of 8 pages, dated Jun. 6, 2017.
Thrun et al., "Probabilistic Robotics"; 1999, 492 pages.
Choset et al., "Principles of Robot Motion", Theory, Algorithms, and Implementations, Chapter 6—Cell Decompositions, 2004, document of 41 pages.
Durrant-Whyte et al., "Simultaneous Localization and Mapping (SLAM): Part I The Essential Algorithms", in: IEEE Robotics and Automation Magazine, vol. 13, No. 2, pp. 99-108 Jun. 2006.
Vasquez-Gomez et al., "View planning for 3D object reconstruction with a mobile manipulator robot," 2014 IEEE/RSJ International Conference on Intelligent Robots and Systems, Sep. 14, 2014 IEEE, pp. 4227-4233.
Forlizzi, How robotic products become social products: An ethnographic study of cleaning in the home, 2007, IEEE, p. 129-136 (Year: 2007).
Kim et al., "User-Centered Approach to Path Planning of Cleaning Robots: Analyzing Users Cleaning Behavior." Proceedings of the 2007 ACM/IEEE Conference on Human-Robot Interaction, Mar. 8-11, 2007, pp. 373-380.
Mahyuddin et al., "Neuro-fuzzy algorithm implemented in Altera's FPGA for mobile robot's obstacle avoidance mission", Tencon 2009—2009 IEEE Region 10 Conference, IEEE, Piscataway, NJ, USA, Jan. 23, 2009; document of 6 pages.
Neto et al., Human-Machine Interface Based on Electro-Biological Signals for Mobile Vehicles, 2006, IEEE, p. 2954-2959 (Year: 2006).
Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.
Japanese Patent Office, "Notice of Refusal," issued in Japanese patent application No. 2018-5300086, dated Nov. 25, 2021, document of 8 pages.

* cited by examiner

REMOTE CONTROL OF AN AUTONOMOUS MOBILE ROBOT

CROSS REFERENCE TO RELATED APPLICATIONS

This application is a Continuation-In-Part Application and claims the benefit of PCT/EP2016/080235 designating the United States, filed Dec. 8, 2016, the entirety of which is herein incorporated by reference and which claims priority to German Patent Application No. DE 10 2015 121 666.3, filed Dec. 11, 2015.

TECHNICAL FIELD

This disclosure relates to a mobile autonomous service robot such as, e.g. a robot for processing surfaces (cleaning floors, mowing lawns, painting a surface, etc.). The disclosure relates, in particular, to methods for the remote control of such robots.

BACKGROUND

In recent years, autonomous mobile robots, in particular service robots, are being increasingly employed in the household, for example to clean floors or to monitor an apartment (night watchman function) or to transport objects into an apartment. Some of these robots can be monitored and controlled by means of a device that serves as a remote control (such as a computer). Also known are service robots that can send messages to a user or be remote controlled by a user over a long distance by employing an internet connection or mobile phone network to communicate with a mobile device of the user.

The known solutions either only provide for a locally employable control of the robot or for a control over the internet, whereas a control and monitoring of the robot over the internet is susceptible to hacking by unauthorized persons. Further, the robot may send information, e.g. concerning its status or the task that is being carried out or that is to be carried out by the robot, which is not necessarily of any aid to the user. For example, the information that the robot is incapable of cleaning a room due to a closed door may be of only minor relevance for the user if he/she is not in the proximity of the apartment, as in this case he/she cannot immediately remedy the problem.

This application discloses a method for monitoring and controlling an autonomous mobile service robot by means of a mobile device, without the user having to devote undue attention to the communication channel between the device and the robot. Further, the "intelligence" of the robot's communication with the user should be improved.

SUMMARY

A system having at least one mobile autonomous robot (service robot) and at least one mobile device for the control the robot is described herein. In accordance with one embodiment, the system further comprises at least one communication server that has a network interface with access to the public internet. The robot and the mobile device are configured to communicate both via a first connection, as well as via at least one second connection, whereas the second connection is a local wireless communication connection and the first connection is an indirect communication connection, in which the communication server relays the communication between the robot and the mobile device. If one of the two connections is interrupted or setting up the respective communication connection fails, an attempt is made to change the communication connection.

Further, a method for communicating between a mobile device and a mobile autonomous robot is described herein. In accordance with one embodiment, the method includes setting up a communication connection between the robot and the mobile device via a first connection or via a second connection, whereas the second connection is a local wireless communication connection and the first connection is an indirect communication connection, in which a communication server that is accessible via the internet relays the communication between the robot and the mobile device. The method further includes changing the communication connection from the second connection to the first connection if the second connection is interrupted or setting up the second connection fails.

Further, a method for coupling a device with a mobile autonomous robot is described herein. In accordance with one embodiment, first the robot initiates a communication connection with a server and the mobile device sends a request to the server. The server informs the robot of the request from the device by means of a message. The robot then waits for a certain user interaction, by means of which the request is confirmed by the user. If the user interaction is carried out within a specified period of time, the robot will carry out control commands that are henceforth sent to the robot by the device via the server, otherwise a control of the robot via the communication connection with the server will be denied.

Further, a system with at least one autonomous mobile robot and at least one mobile device is described herein. In accordance with one embodiment, the robot and the device are configured to communicate via at least one first wireless connection. The robot is configured to determine information concerning the location of a user (e.g. based on the location of the device) and, dependent on the determined information concerning the location, to decide whether, and if so, then which information is to be sent to the device and/or whether, and if so, then which tasks are to be carried out, interrupted, continued or ended by the robot.

Further, a system with at least one autonomous mobile robot and at least two mobile devices is described herein. In accordance with one embodiment, each of the mobile devices is configured to communicate with the robot. The robot is configured to allow changes to the information stored in the robot by one of the mobile devices and to send information concerning possible changes to at least one other mobile device.

Further, a system with at least one autonomous mobile robot, at least two mobile devices and at least one server with internet access is described herein. Each of the mobile devices is configured to communication with the robot, whereas the server relays the information. The robot and server are configured to synchronize the information stored in the robot with the information stored in the server.

This disclosure also relates to an autonomous mobile robot. In accordance with one embodiment, the robot comprises a navigation module that is configured to navigate the robot through the area of robot employment with the aid of a map of the area of employment and sensor information available in the robot. A detection unit of the robot is configured to detect at least one of the following events: the user enters or leaves the area of robot employment, has entered or has left the area or is just in the process of entering or leaving the area. A control module of the robot is configured to trigger a previously specified action of the robot when the detection unit detects one of the events, whereas the previously specified action consists in the robot moving to a location previously specified on the map and beginning a previously specified operation.

Further, a system with a first and with at least one second autonomous mobile robot is described herein. In accordance with one embodiment, these are configured to communicate with each other, whereas the first robot is configured to carry out a first operation and the second robot is configured to carry out a second operation. The first robot is configured to receive a command from a user to begin an operation, to interrupt and/or terminate it, whereas the first robot informs the second robot of the user's command and the second robot is configured, based on this information, to decide whether to begin the second operation, to begin the operation with a delay or to interrupt and/or terminate it.

In accordance with a further embodiment of the aforementioned system, at least the first robot is configured to detect whether a user leaves or enters the area of robot employment, whereas the first robot informs the second robot when it detects that a user leaves or enters the area of robot employment and the second robot is configured, based on this information, to decide whether to begin the second operation, to begin it with a delay or to interrupt and/or terminate it.

Further embodiments refer to a method for controlling autonomous mobile robots with at least one mobile device. It should be explicitly mentioned that the various features described in the context of an embodiment may also be used (provided they are not explicitly otherwise described) with all other embodiments in order to thus create further embodiments.

BRIEF DESCRIPTION OF THE DRAWINGS

Various embodiments are described in the following based on the examples illustrated in the figures. The figures are not necessarily true to scale and the embodiments are not limited to only the shown aspects. Instead importance is placed on illustrating the underlying principles. The figures show.

DETAILED DESCRIPTION

Figure 1:
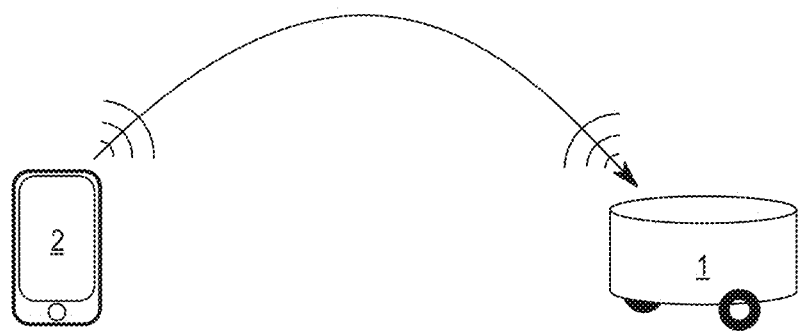
FIG. 1 shows the control of a mobile autonomous robot by means of a mobile device that communicates with the robot via a wireless connection (e.g. Bluetooth).

In accordance with the embodiments described herein, the user of an autonomous mobile service robot is to be enabled to control and monitor the service robot with the aid, for example, of a smartwatch, a smartphone or a tablet PC. This is to be possible both locally in the area of robot employment (e.g. the apartment of the user), as well as from a distance (outside of the area of robot employment). This should bring about no significant changes for the user in the handling of a mobile device for the control and monitoring of the service robot.

In order to allow for a secure and reliable communication between the robot and a mobile device located outside of the area of robot employment, both the robot and the mobile device can connect with a communication server that is accessible via the internet. In the area of robot employment (such as, for example, in the apartment of the user), however, the control of the robot should not take place via the internet, but instead via a direct connection between the robot and the mobile device. This makes it possible to avoid an unnecessary (and possibly fee based) data transmission (on the user and the server side) and should improve the quality and the security of the data exchange. The direct connection between the robot and the mobile device may be set up, e.g. via a home network such as, for example, via a WLAN (Wireless Local Area Network). Further details concerning possible types of connections will be explained further below. A server is not necessarily understood, in this context, to be a specific computer or specific hardware, but rather a server service (server daemon) that is executed on a computer. The communication server is thus software that transmits the communication between the device and the robot.

The autonomous mobile robot can carry out, automatically as a service robot, one or more tasks such as, e.g., the cleaning or monitoring of an apartment or of a building (or of a part thereof), as well as the transport of objects within a building. Each robot may have a specific identification number (UID, Unique Identification Number) with which, for example, it can log in to the mentioned communication server. Further, the user may also give a name to his/her robot. In order to be able to autonomously carry out a task in an area of employment, the robot generally has devices for navigation (cf., for example, FIG. 9, navigation module 110). For example, it can be equipped with sensors (included e.g. in a sensor module such as sensor module 130 shown in the example of FIG. 9) for identifying obstacles and for compiling a map of its environment.

The mobile device may be, e.g. a smartwatch, a smartphone, a tablet PC or a portable computer having a suitable application (abbreviated: app) that provides a graphical user interface. The autonomous mobile robot and the mobile device each have at least one communication interface. This may be, for example, a WLAN module, with which a connection with a local WLAN (in the area of robot employment) can be set up. The WLAN can facilitate a connection to the Internet and/or a direct connection between the robot and the mobile device. Other known possible communication interfaces include wireless connections such as, for example, the mobile telephone network (UMTS, LTE), Bluetooth, ZigBee, Z-Wave or Near Field Communication (NFC), or direct connections such as, for example, a USB interface.

In accordance with the embodiment described herein, the control and monitoring of the robot with the aid of the mobile device may encompass various aspects. The mobile device may be employed, for example, to display status information, to make use of calendar functions and to enter commands for the robot. Status information includes, for example, the display of the charging status, a map of the area of robot employment with information regarding a cleaning or a monitoring of the area or the location of the robot in its area of employment. With the aid of the mentioned calendar function, regularly occurring tasks or one-time tasks that lie in the future can be assigned to the robot. This means that a schedule can be drawn up for the tasks to be carried out by the robot. Examples of this include "Begin a cleaning every week on Monday at 9 am" or "Monitor the apartment this evening from 8 to 10 pm to detect unusual activities". Commands given to the robot include, for example, the start of a new task or the interruption of a task being carried out by the robot. This may be, e.g., the cleaning or the monitoring of a specifiable area or movement to a specifiable location such as, for example, the base station of the robot.

In accordance with the embodiments described here, the mobile device for the control and monitoring of the robot can send various requests to the robot which, in turn, sends a corresponding response back to the mobile device and/or carries out a corresponding action. These requests can be divided into two groups:
  (i) regular requests, in particular regarding the status of the robot,
  (ii) user induced requests, in particular commands for the robot.

Regular requests include, for example, status information such as the charging status or also the regular updating of map information such as, for example, a cleaning map (on which the robot can mark the areas that it has already cleaned). User induced requests are one-time and/or unforeseeable commands such as to change an entry in the calendar (for example, for a regular cleaning) or the command for the robot to immediately carry out a task such as, for example, a quick cleaning or to interrupt the execution of a task.

The above mentioned communication server can provide a communication service (server service) that allows for the communication between the robot and the mobile device over great distances and that is permanently accessible, e.g. via the internet. For this purpose, both the robot and the mobile device can register with (log in to) the communication server. The communication server is configured, for example, as a cloud service, as a virtual server, as an individual service computer (host) or as a network of service computers (cluster). In some embodiments, the connection between the robot and the communication server or between the mobile device and the communication server cannot take place directly, but only through relay over a further server service. For example, for home automation (smart home), the control of numerous different devices can be bundled for the mobile device into one application. This application then contacts a central server that relays or forwards the communication to the particular communication server that is specialized for each device (for example, the service robot in question).

Figure 2:
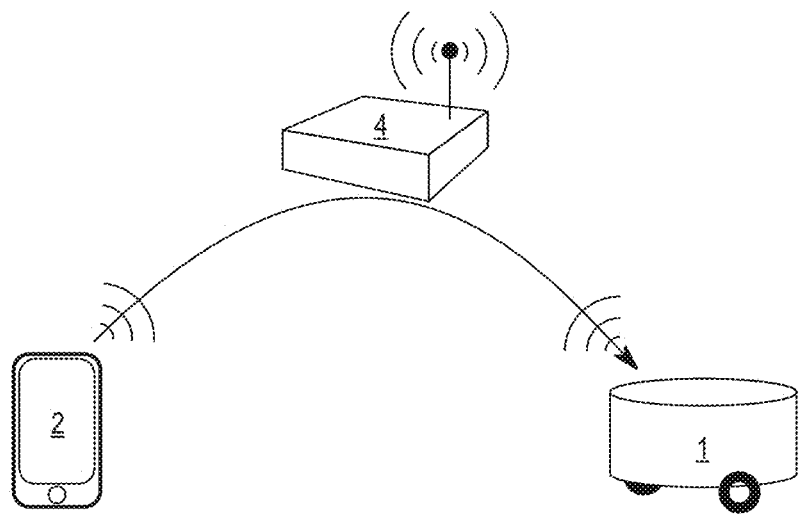
FIG. 2 shows the control of a mobile autonomous robot by means of a mobile device that communicates with the robot via a wireless local network (e.g. WLAN, Wireless Local Area Network).
Figure 3:
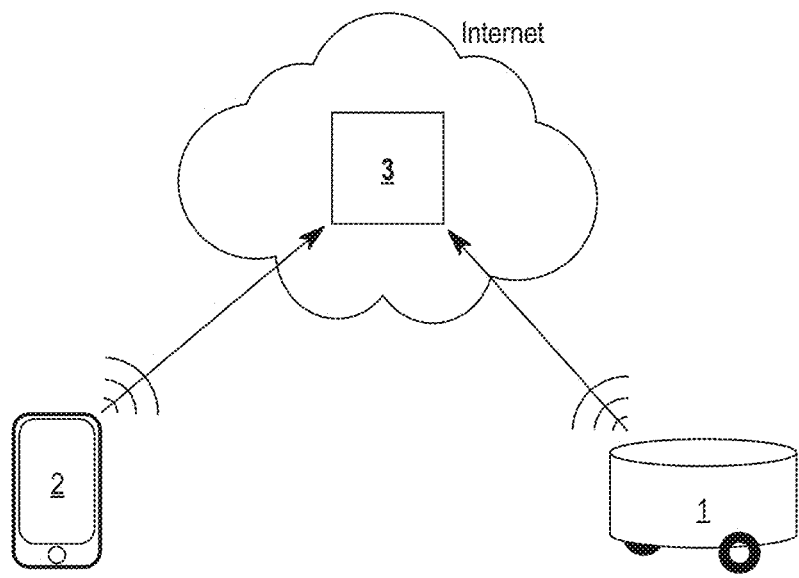
FIG. 3 shows the control of a mobile autonomous robot by means of a mobile device, whereas a server accessible via the internet relays the communication between the mobile device and the robot.

Various possibilities for setting up a connection between a mobile autonomous robot 1 and a mobile device 2 are shown in FIGS. 1 to 3. In accordance with the embodiment described here, the mobile device 2 tests the available types of connection to the mobile robot 1 and automatically chooses a suitable connection as soon as the user activates the function for controlling and monitoring the autonomous mobile robot 1 on the device 2. Certain types of connection may be given preference when doing so. For example, a local connection (direct connection or connection within a WLAN) may be preferred.

In the example of FIG. 1, the robot 1 offers a direct wireless connection such as, for example, Bluetooth, NFC or WLAN, which the device 2 can recognize and associate with the robot 1. For example, the robot 1 uses its WLAN module (cf. FIG. 9, communication module 103) to initiate a WLAN with a network identifier (for example, SSID, Service Set Identifier) that can be distinctly associated with it, by serving as an access point (router). Alternatively, the mobile device 2 can form together with the robot 1 a mobile ad hoc network (MANET) (with no access point). The mobile device 2, in this case, determines the availability of a robot 1 based on the availability of the WLAN belonging to the robot 1 (e.g. based on the presence of the robot's SSID). The association is performed, for example, by the network identifier receiving the UID of the robot.

In the example in accordance with FIG. 2, both the robot 1 and the mobile device 2 are logged in to a local wireless network, for example, in a WLAN provided by a router 4 having a WLAN access point. The device 2 can send an mDNS request (multicast Domain Name System) to determine whether, and if so which robot(s) 1 is (are) available in a local (in the area of employment of the robot) WLAN system in order to send to the robot or robots requests and commands. In order to avoid unnecessary data transmission in different wireless networks, the device 2 can take note of (i.e. save) those networks (SSID) in which the robot was available in the past. It then automatically tests the availability of the robot 1 in these networks. The device 2 only searches for a robot 1 in other networks when commanded to do so by the user.

In the example shown in FIG. 3, both the robot 1 and the mobile device 2 are connected with a communication server 3 that is accessible (for the device 2 and the robot 1), for example, via the internet. The connection to the internet can be realized, for example, via a WLAN router with internet connection (e.g. for the robot 1) or via the mobile telephone network (e.g. for the mobile device 2). When the mobile device 2 reaches the communication server 3 it sends a request to the communication server 3. The latter sends a response to the device 2, informing the device 2 which robots 1 are available via the concerned communication server 3 (meaning which robots 1 are connected with the communication server 3). The mobile device 2 can now send requests and commands for the robot 1 to the communication server 3. The latter forwards the requests and commands from the device 2 to the robot 1. The robot 1, in turn, sends its response to the communication server 3, which then forwards them to the mobile device 2.

In accordance with one embodiment, the mobile device 2 can send a request via the communication server 3 to the robot 1, asking which local connection possibility it can currently enable. The robot 1 responds to the communication server by informing it which WLAN (SSID) it is logged in to and with which IP address. The mobile device can then check whether this WLAN is available from its present location and can set up a local connection. This procedure is advantageous when, for example, for technical reasons an mDNS request is not possible or is too slow within a given WLAN. Furthermore, the device 2 can observe over time whether it has entered the coverage area of the WLAN and can then directly connect with the robot via WLAN without making a repeated mDNS request.

In accordance with one embodiment, when the application on the device is used, the mobile device 2 can monitor the types of connection available to the robot 1. If the current connection (for whatever reason) is disrupted, it will attempt to set up a new connection via an alternative path. The device can also search for alternative connection possibilities regardless of whether the current connection between the mobile device 2 and the robot 1 is disrupted. When the current connection uses the communication server 3, the mobile device 2 can constantly or periodically search for a local connection possibility and can use the latter instead of the connection via the communication server 3. The mobile device 2 can inform the user and/or the robot 1 of a change in the connection possibility and enable them to react to this. Alternatively or additionally the robot can be configured to detect a change in the communication connection to the device 2 and, if necessary, react to a detected change. For example, the robot can determine whether a command or a request has been received directly by the device 2 or by a communication server (e.g. using the IP address).

In one example, the robot 1 and the mobile device 2 are logged in to the same (local) WLAN and communicate via this connection. If the user with the mobile device 2 leaves the apartment, the mobile device 2 loses the connection to the local WLAN in the area of robot employment and thus also loses the direct connection with the robot. The mobile device 2 can now attempt to set up a connection to the communication server 3 (for example, via the mobile phone network), in order to connect by these means with the robot 1. At the same time, the user, for example, is asked whether the robot 1 should begin a task, for example, the monitoring or cleaning of an apartment. Alternatively, the robot can be informed of the change in the connection type. It can then test whether it should change its current status by, for example, automatically beginning a task. For example, the user leaving the apartment can automatically trigger the robot 1 to monitor or clean the apartment.

In a further example, the user with the mobile device 2 comes home. In this case the mobile device 2 detects the new local connection possibility to the robot 1, for example via a mutually shared WLAN or a Bluetooth radio connection. Now the user can be given a brief status report. In particular, the user can be informed of particular events. For example, the user can be informed that the robot 1 was not able to clean a room because a door was closed. Since the user is now at home he can open the door so that the robot 1 can complete the cleaning. Alternatively, the robot 1 can react to the possibility of a new local connection, for example, by ending its currently performed task such as the cleaning or monitoring of an apartment. Thus it can be avoided that the user is disturbed by the work of the robot 1. The possibility of sending messages to the user when the type of connection changes or dependent on the type of connection will be explained in greater detail further below.

In order to allow for the type of connection between mobile device 2 and robot 1 by means of the communication server 3, as shown in FIG. 3, the robot 1 must be connected with the communication server 3. As the robot 1 is usually located in a private network (e.g. WLAN), it will generally (e.g. due to changing IP addresses and/or differing security features such as firewalls and the like) not be directly accessible from outside of the private network. In general, the communication server 3 cannot initiate a connection to the robot 1 on its own. For this reason, the connection between robot 1 and communication server 3 is generally initiated by the robot 1. The connection may be permanent or may only be opened for the purpose of a short transmission of data. If the connection time is short, setting up the connection can be repeated and/or may only take place when the status of the robot 1 has changed.

Figure 4:
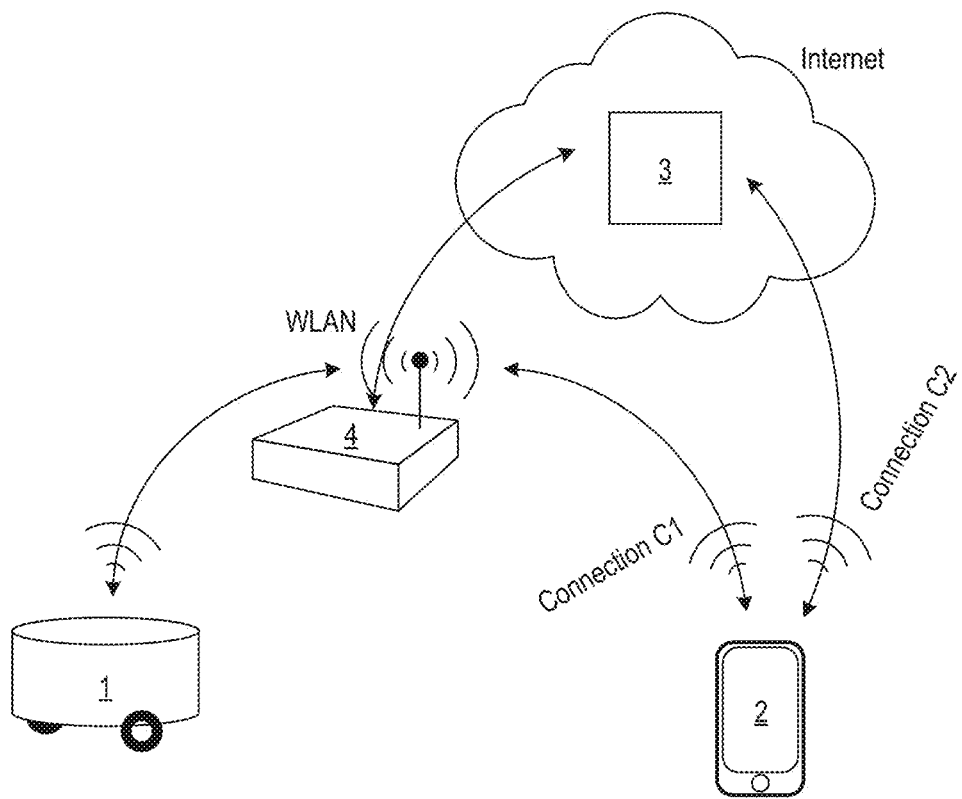
FIG. 4 shows the two alternative employable connections for communicating between mobile devices and robots.

A further example is shown in FIG. 4. Accordingly, the robot 1 is logged in to a router 4 with a WLAN access point in its area of employment and is thus connected with a wireless local network (WLAN) in its area of employment. The WLAN access point may also be integrated in the robot 1 instead of in the router. The robot can set up an internet connection with the communication server 3 via the WLAN router 4. When it is in or in the immediate proximity of the area of robot employment, the device 2 can also connect with the wireless local network and can communicate with the robot 1 in the local network (without an intermediate router—connection C1). Alternatively, the device 2 can connect with the server 3 via the internet through another communication connection (connection C2). The server 3 transmits, as described above, the communication between robot 1 and device 2, which thus indirectly communicate via the server 3.

In a simple example, the communication server 3 transmits the communication between robot 1 and mobile device 2 directly. To do so, however, the connection between robot 1 and communication server 3, as well as that between the mobile device 2 and the communication server 3, must be permanent and very good. In order to be able to quickly respond to requests from the mobile device 2 regarding the status of the robot 1, it is advantageous for the communication server 3 to regularly request and save information concerning the current status of the robot 1. When the mobile device 2 then sends a request for information only, the communication server can thus immediately send a response, without having to first forward the request to the robot and to wait for its response after having received the server's request and before responding to it. When doing so it can also be tested how much time has elapsed since the last connection to the robot 1, i.e. to what extent the information received and saved by the robot 1 is up to date. If the elapsed amount of time exceeds a specified value (for example, five minutes), then the mobile device 2 is also informed of the fact that there is currently no connection to the robot. The communication server will then intermediately save any command given to the robot 1 until the robot 1 has set up a new connection. For this, a specified time (for example, 10 seconds) can be predetermined, after which the mobile device is informed of the fact that the robot is not accessible. For example, the user can decide (e.g. by entering this into the device 2), whether a command sent to the communication server 3 should expire after the elapsed amount of time or whether it should remain in effect.

In order to reduce the amount of data transmitted between robot 1 and communication server 3, the information requested by the communication server 3 can, for example, be dependent on the last known status of the robot. For example, no update of a map need be requested when the robot 1 is recharging itself at its base station.

Figure 5:
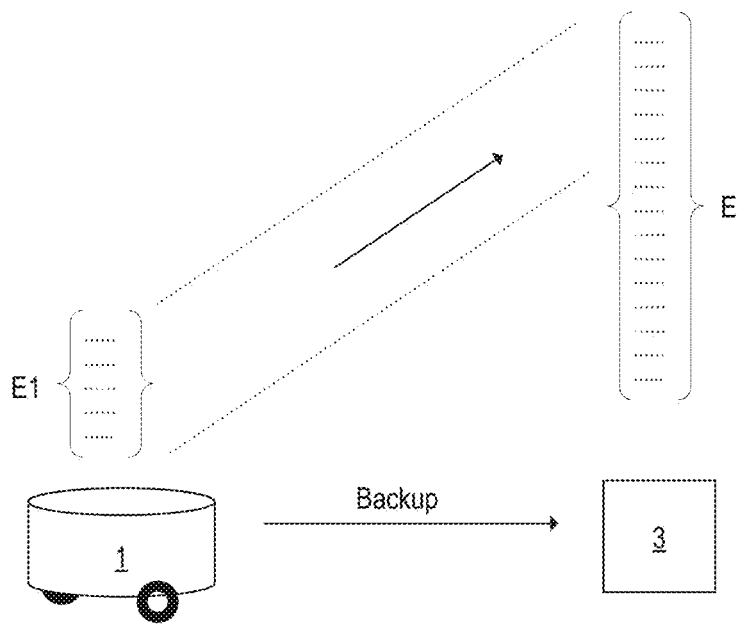
FIG. 5 shows an example of securing event histories and other information stored in the robot on a communication server accessible via an internet connection.

In accordance with the embodiment outlined in FIG. 5, the robot 1 saves the results and events of its work for a brief time in an event history (event log) E1 and makes these available to the user for the purpose of checking and monitoring (e.g. directly or via the communication server 3). In this manner, for example, the user may compare two or more cleaning results with each other. However, since the memory capacity of the robot is limited, the time for which the events can be saved, as well as the number of events that can be saved, is also very limited. When information concerning the status of the robot and/or the event history E1 is regularly sent to the communication server 3 and saved there (event history E on server 3), the user can be offered a longer period of saved events or a greater number of saved events. In addition to this, data sent in this manner to the communication server 3 and saved there may also serve as a backup. For example, the robot 1 can restore the map data of its area of employment if it has been corrupted without having to carry out a new exploratory run. A defect robot can also be replaced by a new one, in which case the new robot is given access to the data saved on the communication server 3, thus providing it with a map of its environment that it does not have to newly compile on its own.

An autonomous mobile service robot 1 gathers, by means of its numerous sensors, sensitive data about its area of employment, including, for example, private data involving the user's apartment. Such data should be protected from unauthorized access by third parties by means of methods such as, for example, encryption using TLS (Transport Layer Security) certificates. At the same time, however, the operability of the robot 1 should not be impaired by too many password requests.

Figure 6:
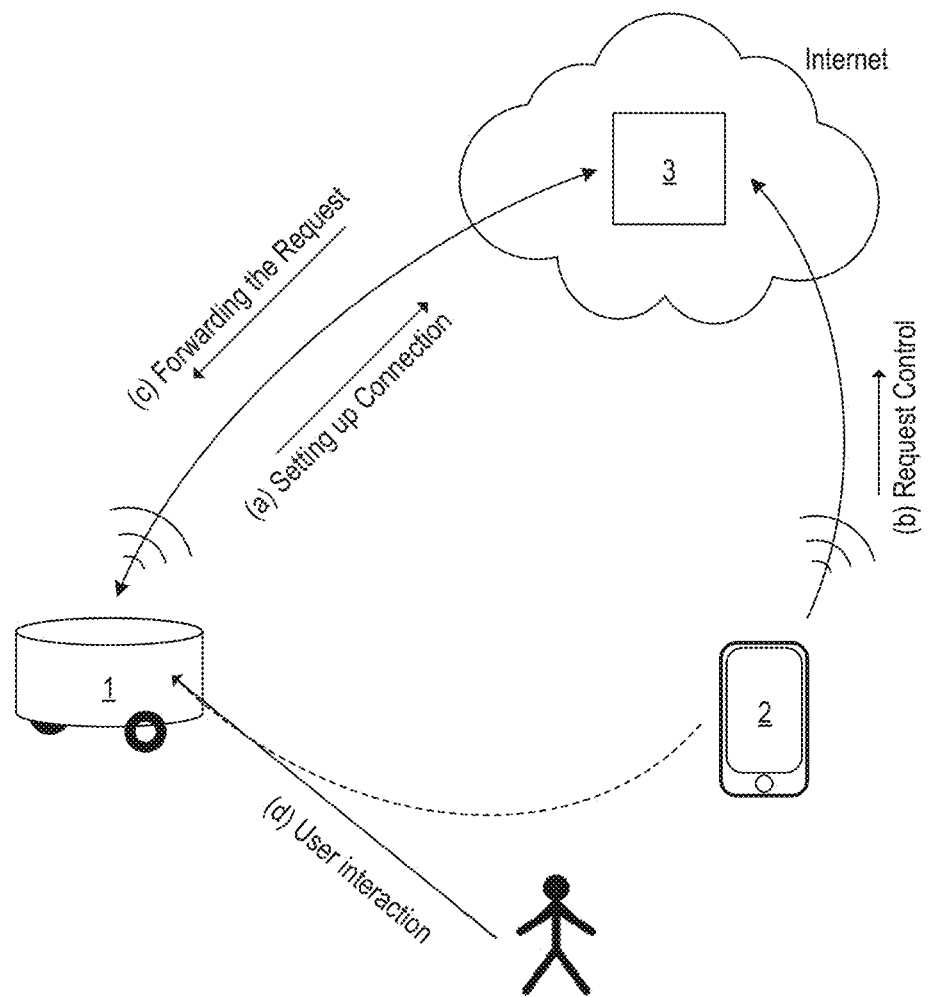
FIG. 6 shows an example of the secure coupling of a robot with at least one mobile device.

In order to introduce an additional level of security that will impede access of unauthorized parties to sensitive data, in one exemplary embodiment the user may provide proof of his access authorization when setting up the robot control via the communication server 3. This may be carried out, as shown, e.g., in FIG. 6, in a direct interaction with the robot 1 that requires the direct physical control over the robot 1 (and over the mobile device 2) on the part of the user. For example, the latter may press a button on the robot 1 or may enter into communication with the robot 1 by means of a direct wireless connection that has a short range of reception (e.g. Bluetooth, Airdrop, NFC, etc.). By these means, access to the sensitive robot data by a person that does not have direct physical access to the computer (an outside hacker) is made considerably more difficult.

This method for setting up the robot control by means of the communication server 3 comprises, in one particular embodiment, the following five steps:
 (a) The user enables the robot 1 to connect to the communication server 3;
 (b) the user requests control of the robot 1 from the communication server 3 via the mobile device 2;
 (c) the communication server 3 informs the robot 1 of the request for control;
 (d) the robot 1 waits for confirmation of this request by means of a direct user interaction (e.g. pressing a button that is physically connected to the robot); and
 (e) upon affirmative confirmation by the user, the robot 1 sends a confirmation of the request to the communication server and allows the robot to be controlled by the mobile device via the communication server 3.

In the following, the described concept is explained in greater detail by means of an example. In step (a) the user enables the robot 1 to set up a connection to the communication server 3. It does so, for example, by giving the robot 1 access to a WLAN router 4 that is connected with the internet. The robot 1 logs in to the communication server 3, for example using its UID (Unique Identification Number), allowing it to be clearly identified.

In step (b) the mobile device 2 connects with the communication server 3 and informs the latter that a connection to the robot 1 is desired. This is carried out, for example, by the user providing an identifier of the robot (e.g. the UID of the robot 1) and a corresponding password. The user can find this information, for example, in the robot's 1 documentation (e.g. user manual). The UID or another identifier of the robot (e.g. a digital certificate) may also be transmitted from the robot 1 to the mobile device 2, for example, via a direct connection (e.g. by means of a point-to-point radio connection such as, e.g. via a Bluetooth connection or by means of NFC or via a WLAN). An alternative "transmission path" between robot 1 and device 2 may comprise the robot 1 having a 2D barcode such as, e.g. a QR code (Quick Response Code), located, for example, on its underside and in the barcode being scanned with the device 2. The robot 1 may also generate a (pseudo) random identifier. If the identifier is to be transmitted via a QR code, then this may be shown, for example, in a display on the robot. In addition, it is possible for the user to log in to a user account on the communication server 3.

In step (c) the communication server 3 informs the robot 1 that a mobile device 2 requests a connection with the robot 1 via the communication server 3. After this, in the fourth step (d), the robot 1 waits for a direct user interaction to take place within a specified period of time. In step (d) there are numerous possibilities for a direct user interaction with the robot 1 that are required in order for the user to physically assume control of the robot. For example, the user interaction may be carried out tactilely by pressing a button on the robot 1 or by triggering a touch-sensitive sensor (e.g. bumper switch) of the robot 1. Further possibilities include the deliberate triggering of a different sensor (such as, for example, an accelerometer, a gyroscope, a wheel-contact switch, a floor sensor, a crash sensor or sensors for measuring the distance to obstacles) by the user by, for example, lifting, bumping, shifting or rotating the robot. More detailed instructions for the user on how to do this are displayed, for example, on the mobile device. In addition, for example, the button to be pressed may light up or blink. If actuation by the user takes place within a specified period of time by means of a physical interaction between user and robot that is detectable by the robot (e.g. the pressing of a button, lifting or turning the robot, etc.), then, in accordance with step (e), the robot 1 sends a confirmation to the communication server 3. In the opposing case, control over the robot via the communication server by means of the mobile device will be denied. After the connection has been confirmed, the authorization of the user and/or the mobile device 2 to control the robot 1 via the communication server 3 can be recorded in a data base on the communication server 3. As an alternative, for example, a digital certificate is saved on the mobile device 2, by means of which it can prove its authorization to control the robot 1 to the communication server 3.

The interaction between user and robot may also consist in the user scanning a code (e.g. a barcode or a QR code) found on the robot or on a display of the robot using a camera integrated in the mobile device. The scanned code is then transmitted via the server 3 to the robot 1, which can verify the code (for this purpose the code is also stored in a non-volatile memory in the robot). The code may be, for example, an identification number that distinguishes the robot (UID, e.g. consisting of its model and series numbers) or a (pseudo) random code or a digital certificate. In this case the robot must show the QR code in a display on the robot. This code, logically, differs from the identifier described above in step (b) that is transmitted to the server. Instead of a code, at least one checksum or a hash value may also be scanned and transmitted.

A further possible direct user interaction in correspondence with step (d) would be a short range communication connection between robot 1 and mobile device 2. Various methods may be used for this, for example, a wire-based connection, for example, by means of USB, or a wireless connection, for example, by means of Bluetooth, NFC or infrared can be used. In this case, for example, the communication server 3 may send to the mobile device 2 via the robot a digital certificate as proof of authorization to control the robot. For this the certificate must be transmitted to the robot, e.g. by means of an infrared or Bluetooth data connection.

The procedure just described should preferably be carried out for every robot 1 and for every user and/or every mobile device 2. In the case of multiple users and/or mobile devices, there may be a master user and/or a master device that maintains and assigns the authorization to monitor and control the robot for other authorized users and/or devices. In this manner one user, for example, can have a cleaning map of the robot shown to him while a second user additionally has the authorization to have currently recorded monitoring (surveillance) images shown to him.

One of the desired automatic operations that an autonomous mobile robot 1 should perform is to inform the user of the results of the tasks carried out by the robot and of problems that might have occurred while doing so. For example, the robot may inform the user that a room cannot be cleaned because of a closed door. This information is only relevant for the user, however, if he is capable of changing these circumstances. If the user is away from home at that point in time (meaning he is not in the proximity of the area of robot employment) and receives such a message ("door closed"), then the user cannot in any way change the situation. The message may then even present a disturbance or the user may forget the message by the time he arrives home. Whether and when sending a piece of information to the user makes sense may thus also depend on the location of the user.

In accordance with one embodiment, the relevance of messages is determined according to whether the user is at home (i.e. in or in the vicinity of the area of robot employment), out of home or currently returning home. When the user is at home, he may be interested in receiving messages if the robot is about to begin an activity that might potentially disturb the user. Such an activity would be, for example, the cleaning of a room. A further interesting message would be that the robot has detected a problem (e.g. a closed door) that it cannot remedy on its own. When the user is away from home, security-related messages from a monitoring robot or those concerning serious problems will be of interest (for example, that the robot cannot begin a planned cleaning because it is locked in a room or located on the wrong floor). If the service robot is carrying out monitoring tasks (night watchman function), certain events could trigger different alarms, depending, e.g., on whether the user is present. Upon returning home after having been out, he might be interested in what state the apartment is in (for example, the results of the cleaning) and in messages concerning problems that the robot could not independently remedy in the user's absence.

Figure 7:
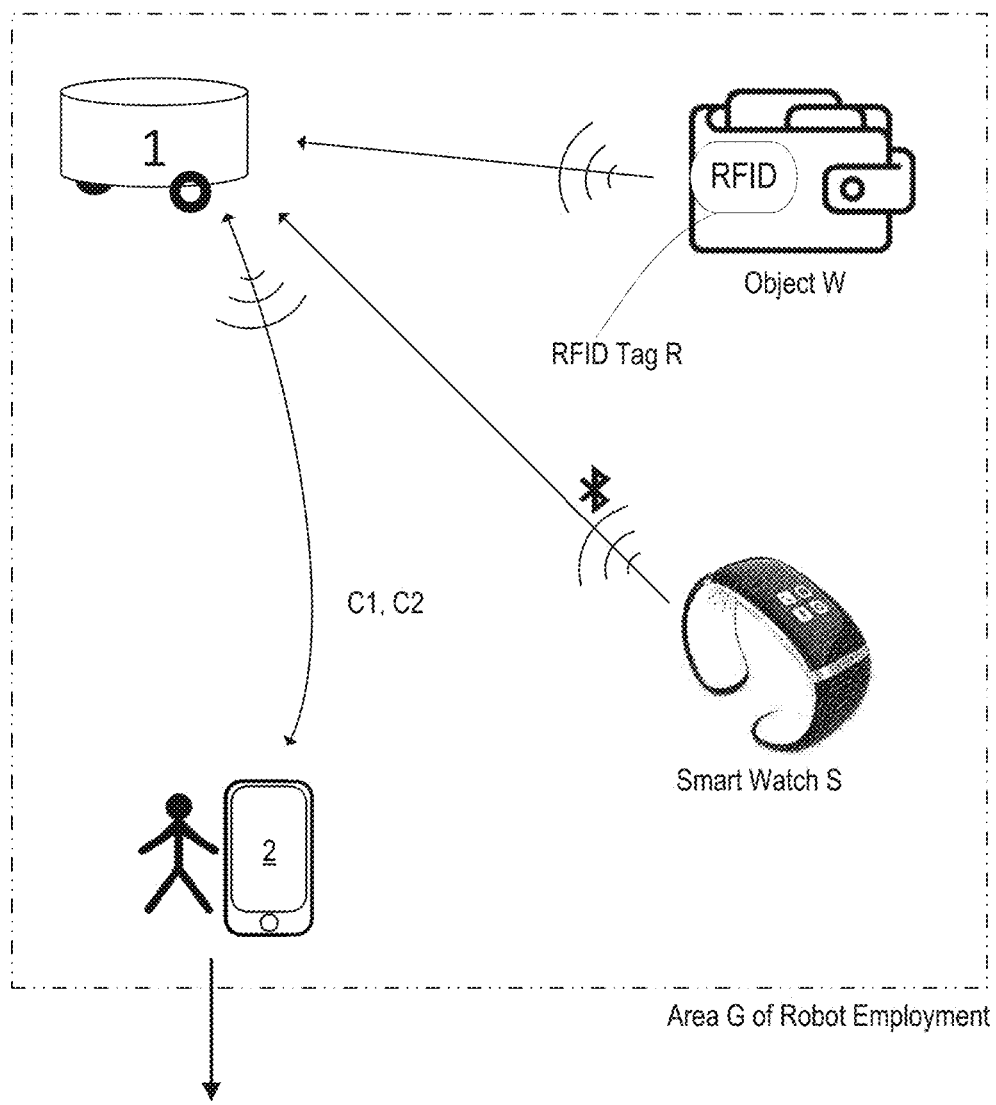
FIG. 7 shows numerous examples of objects that can be detected by the robot, whereas the user, when leaving the employment area, is sent a message that an object has been detected.

The messages sent to the user by the robot may concern its own field of operation, but may also extend beyond it. Two examples are shown in FIG. 7. Accordingly, the robot can remind the user (who is carrying the device 2) of various things, for example, when the user leaves the apartment. It can call to the user's attention that a household appliance such as the stove is still on or that a window is open. Thus the robot can take over tasks that are otherwise achieved by means of elaborate sensor systems. Further, when the user leaves the apartment, the robot can call to the user's attention that he is leaving behind an object G (such as, for example, a smartwatch or a wallet) that he usually takes with him. This can either be learned by the robot 1 over time, or set by the user. For this the robot 1 is configured to be able to detect the presence or location of the object (for example, a smartwatch S or a wallet W). For example, in the case of the smartwatch S, this can be detected based on an active radio signal via, for example, Bluetooth. Alternatively, the object (for example, the wallet W) can be marked with an RFID chip R (RFID tag) and thus be precisely identified and located by the robot 1. It may be necessary for the robot to move through the apartment in order to locate the wallet. If the robot then determines that a user has left the house without his wallet, it can send a corresponding message to the user. Alternatively, the user can also send a request to the robot as to whether it knows the location of the wallet. The corresponding response can depend on the location of the user. If the user is at home, the robot can indicate the exact location and/or even lead the user to the sought-for wallet. If the user is out, the response "The wallet is at home" is perfectly sufficient.

If numerous users are to be able to control the same robot, the robot can check which of the users are present and send a corresponding message to the appropriate user(s). For example, in one household there may be two people who are authorized to control the robot. If the robot 1 detects a problem that it cannot remedy on its own, such as a closed door, then it checks which of the two people is at home and pointedly informs this person by sending a message to the person's device.

The types of connection described above (see FIGS. 1 to 3) between a robot 1 and a mobile device 2 (i.e. wireless direct connections, as well as connections via a router or a communication server 3 outside of the local network and accessible only via internet) involve carrying out, in accordance with some embodiments, a simple estimation of the user's location. Thus, from the type of connection it may be concluded whether the user with the mobile device 2 is at home or not. If a connection between the robot 1 and the device 2 runs via the communication server 3, then the user is away from home. Conversely, a direct connection to a mobile device 2 that the user usually carries with him is an indication that the user is at home. From the changeover between the direct connection and the use of the communication server 3 it can thus be detected whether the user is leaving his home or returning to it.

Figure 8:
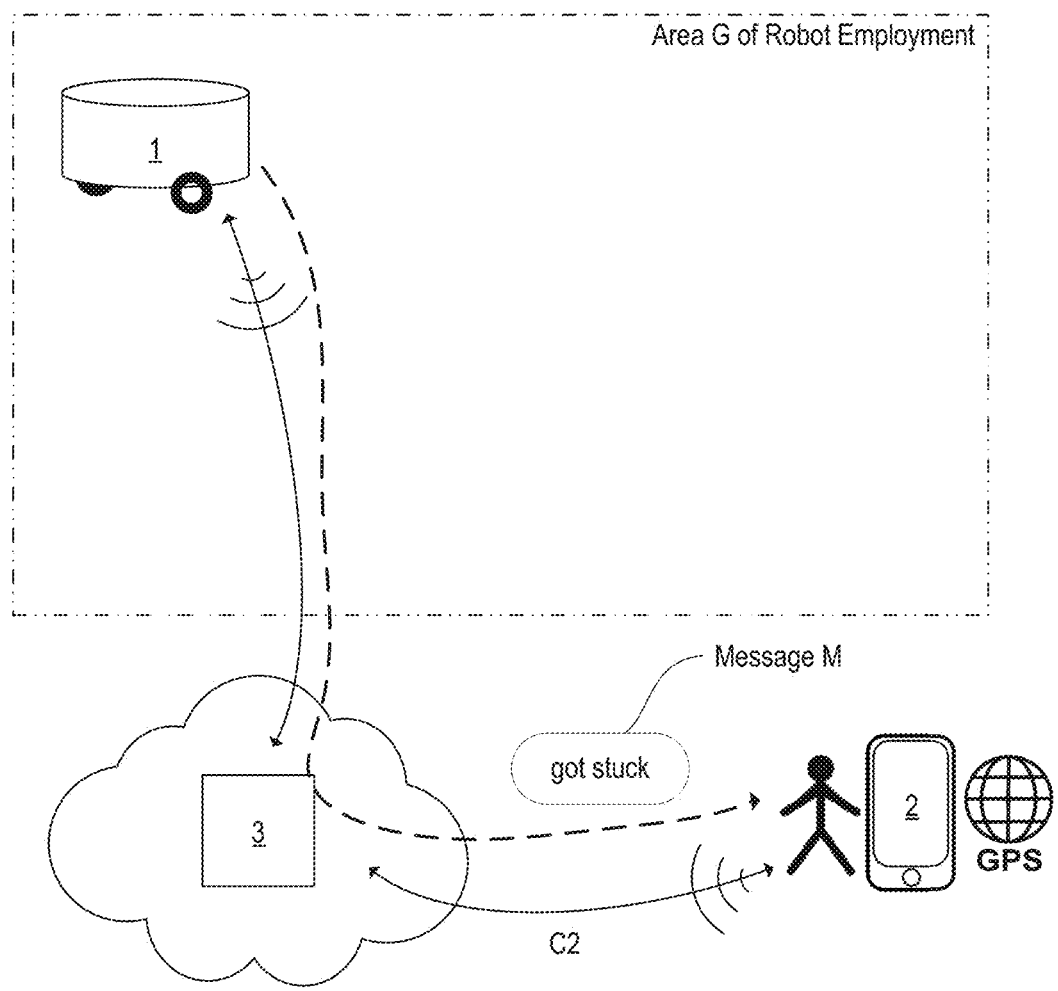
FIG. 8 shows an example of the employment of a GPS receiver in mobile devices to decide whether and what messages are to be sent from the robot to the user.

In some cases it may be useful to evaluate additional information concerning the location of the user. An example of this is shown in FIG. 8. Accordingly, the user may be, e.g. in the garden of his home and out of range of the direct connection (cf. FIG. 4, connection C1), which triggers the setup of a connection via the communication server 3. By evaluating geographic coordinates (determined, e.g., by GPS, Global Positioning System) that are commonly available in mobile devices 2, it can, for example, be determined (by the robot 1 or the communication server 3) that the user is in the immediate proximity of the area of employment G of the robot 1 and a corresponding message may follow. In the present case, the robot 1 sends a message M to the device in order to inform the user that a problem has arisen, e.g. that the robot is stuck. GPS is meant to represent here any satellite navigation system (such as, e.g., GLONASS, Galileo, Beidou, etc.). Other methods of determining the geographical coordinates of the mobile device 2 (e.g. triangulation of cell towers, GSM localization) are also possible. The mobile device, e.g. may regularly send its GPS location to the server 3 and the robot can request the location of the device 2 from the server 3. Alternatively, the server can forward a GPS location request to the device 2 and then forward the corresponding response to the robot 1.

In addition to evaluating the connection types, there are further possibilities for determining the presence of a user or of another person (e.g. a child, an unauthorized person, etc.). For this, for example, the robot may use sensors, for example, a camera or a microphone, to detect the movement of a person. In the case of camera-based detection, e.g. algorithms for face recognition may be employed. Further, for devices that the user does not usually carry with him but that are used to control and monitor the robot (for example, (smart) television, PC, possibly also a tablet PC), the usage activity can be tested and on this basis it can be decided whether a message will be forwarded to the mobile device 2. The presence of a user may also be detected with the aid of other devices, such as an alarm system. Thanks to the increasing interconnectedness of a wide variety of household appliances (IoT, Internet of Things), the robot can also make use of usage data from another robot, a coffee machine, a stove, electric blinds or even those of fitness and health trackers. Thus, a specific command given to a device by a user may indicate that he intends to leave the home. For example, he may request a transport robot to bring him his street shoes. The transport robot conveys this command to a second robot that is used to monitor and/or clean the house, triggering the latter to automatically carry out one of the above described searches for forgotten items, open windows, etc. A cleaning robot can also check whether all areas to be cleaned are accessible and, if necessary, call to the user's attention a closed door before the user leaves the house.

The mobile robot 1 can easily send a message to the user when a connection to the mobile device 2 has been set up. If there is no direct wireless connection, the robot may revert to other notification services such as, for example, email, SMS or a push service such as, for example, the Apple Push Notification Service or the Google Cloud Messaging service. These means of messaging can be initiated by the robot 1 or, alternatively, by the communication server 3.

For example, the robot may first attempt to send a message to the mobile device over a direct connection. If this does not work, then the message can be sent to the communication server. The communication server may again attempt to send the message directly to the mobile device. For example, the server may wait for a specified amount of time for the mobile device to contact it. After this time has expired, the communication server may send, for example, a push message or an SMS.

In accordance with one embodiment, after the user has left the house the robot can specifically check whether the windows and house doors are closed and/or whether the electric appliances have been turned off and can either close the former or turn off the latter on its own and/or inform the user of a critical situation (as described in the passage above). When the user arrives home the robot may come into the corridor to greet him, entertain him or bring him his house slippers. After the user has left the corridor the robot may begin to clean it in order to remove any dirt brought in with the user's street shoes. Before doing so the robot either attempts to detect whether the user has left the corridor, or it waits a specified amount of time. A further possibility is a transport robot that offers to carry items that the user might have purchased into, for example, the kitchen.

In order to realize all these examples, it can be advantageous for the autonomous mobile robot to possess a map of its area of employment so that it can easily navigate the area of employment. Certain positions or subareas of the area of robot employment may be linked to specific actions that can be triggered when the user reaches or leaves home. Linking a given area to a corresponding action can be carried out by the user. In order to improve the utility of the robot even further, it can be configured to recognize and save the relevant areas automatically. Thus, for entertainment purposes, the user can adjust the robot to greet him when he arrives home (linking "corridor" to the action "greeting" and the event "user arrives home"), and/or to offer a task such as the transport of purchased items. The areas that are relevant to this task can be learned by the robot or interpreted based on specifiable criteria from a map.

For example, the robot can sector the map of its area of employment into subareas that correspond, for example, to the rooms of an apartment. The user may give these subareas designations (tags) such as, for example, "living room", "kitchen" or "corridor". Other methods are also known for the robot to recognize the function of a given area (e.g. identifying typical objects by means of image processing). In order to greet the user when he arrives home, the robot can thus enter the subarea designated as "corridor".

Alternatively, the robot can learn where the user's entrance and exit areas are located in its area of employment. During its first exploratory run through the area of employment (during which the map is created) the robot can, for example, detect (for example, based on information from the mobile device) that the user is arriving home. The robot will then look for the user within its area of employment and the location at which the user is finally found will be saved. During a subsequent run, the robot can first move to the saved location, enabling it to find the user much more quickly. The location at which the robot discovers the user will again be saved. After a few repetitions, the thus determined and saved location can be reasonably described as the entrance and exit area and this information can be shared with other robots.

When the robot detects that a user has arrived at or left the area of robot employment, it may happen that it is, at that moment, occupied with a different activity. In this case the robot must check whether it should interrupt the activity in order to carry out a new one. For example, the robot may have been assigned the task of cleaning the corridor after the user has arrived home. If at that moment the robot is recharging its battery, it may make more sense for the robot to postpone cleaning the corridor until the battery is fully charged. In other cases, postponing the activity may not be appropriate, in which case the activity may be omitted altogether, for example, if the robot is located on a different floor of the building and cannot access the corridor. Further, the robot may begin, postpone or omit an activity depending on whether further users of the robot are present in the home or not.

Robots exist that, for example, store their map data on external computers or in a cloud service. If the connection to the computer is interrupted, however, they are no longer able to carry out their tasks. In order to ensure that the robot is able to operate autonomously, all data that the robot requires to carry out its assigned task, such as map data for navigation, but also data for connecting to local networks, are stored in the robot. In a similar manner, user specific data may also be stored in the robot (e.g. in a memory, cf. FIG. 9, memory module 120) and be thus available from various devices. For example, the user may set up his robot with the aid of a first mobile device such as, for example, a tablet PC. For example, with the aid of the tablet PC, the user may give the robot a name, enter calendar days for future tasks of the robot or personalize map data by designating areas and subareas (e.g. designating rooms as "living room" or "bedroom") and defining prohibited areas. When, for example, the user is then away from home and wants to control and monitor the robot with a different mobile device (e.g. a smartphone), these personalized data should also be available. One common solution for this is to store the data in a cloud memory, thus making the data available to the user from different devices. The control and monitoring of the robot, however, then depends on an Internet connection of the mobile device. In accordance with the embodiments described here, the personalized data can therefore also be stored in the robot and are thus accessible from every device that can connect with the robot.

Further, it may also occur that numerous users employ the same robot. In this case it may be advantageous to install a user administration in the robot that is capable of handling various devices and users. For example, the user administration can carry out a prioritization of users and/or devices if they all want to perform changes on the robot at the same time. For example, a first user might command the robot, via the communication server, to carry out a cleaning. A second user who, at this time, is at home might be disturbed by this and may therefore, via a local connection, command that the robot return to its base station. In this case, the command that is transmitted via the local network will have a higher priority and will therefore be carried out. The first user, if necessary, will be informed of this.

Further, various authorizations may be granted to the users. Thus, for example, one user may be allowed to assign tasks to the robot in a schedule (calendar function), while a second is only permitted to view the planned time periods. Still further, for each calendar entry, the user who made the entry can also be saved. If the entry is changed by a further user, the first user will be informed of this. If needed he may then either confirm or rescind the change.

In the case of various users and/or devices, the robot can be configured as to which user and/or device will be informed of a specific event. A further possible configuration is the choice of the mobile device that can be used to determine the location of a user in order to send the location-dependent (depending on the current location of the user) messages described above. For example, a smartwatch or a smartphone that the user usually carries with him will be used, whereas a tablet PC that is usually left at home will be ignored.

When numerous robots are employed in a household, the two or more robots inform each other of the personalized adjustments made by the user. Thus, the user must only once personalize the map of a first robot by designating areas and subareas. Afterwards, the first robot informs a second robot of this personalized map data. This takes place, for example, via a direct wireless connection such as Bluetooth or via a local network such as, for example, a WLAN. The exchange of map data among the robots allows for a general improvement of the map data available to a robot. For example, a vacuuming robot and a mopping robot may be employed in one apartment, whereas the mopping robot, for example, will not move onto a carpet. By exchanging map data, the mopping robot obtains additional information about its environment. In addition to this, it can show to the user the same map as that of the vacuuming robot. Further, the vacuuming robot can inform the mopping robot of a command from the user to clean the apartment and may additionally let it know which surfaces it has already vacuumed.

At the same time, the robots can thus use each other as backups, making it easier to replace a defect robot. In one example one robot is employed on each floor of a house with two floors. Exchanging map data allows, for example, the robot from the first floor to be directly employed on the second floor without the need for an additional exploratory run. For example, a robot newly purchased by the user can obtain the map and other data from a robot already employed in the household, which significantly reduces the effort needed to set up a robot. For example, in this manner an exploratory run, during which the robot becomes acquainted with its area of employment and compiles a map thereof, can be omitted.

If a communication server is used, it may naturally also be utilized to store additional data that is not immediately needed for a robot to carry out a task. For example, the robot may maintain data concerning the progression of its activity for a specified period of time. Due to the limited memory capacity of the robot, this time period is also very limited. In order to extend this period of time or permanently save individual events, the communication server or a cloud memory may be used. In addition to this, the server may also be used as a backup for the robot, which, in particular when only one robot is employed, affords the advantages of a backup described above.

Figure 9:
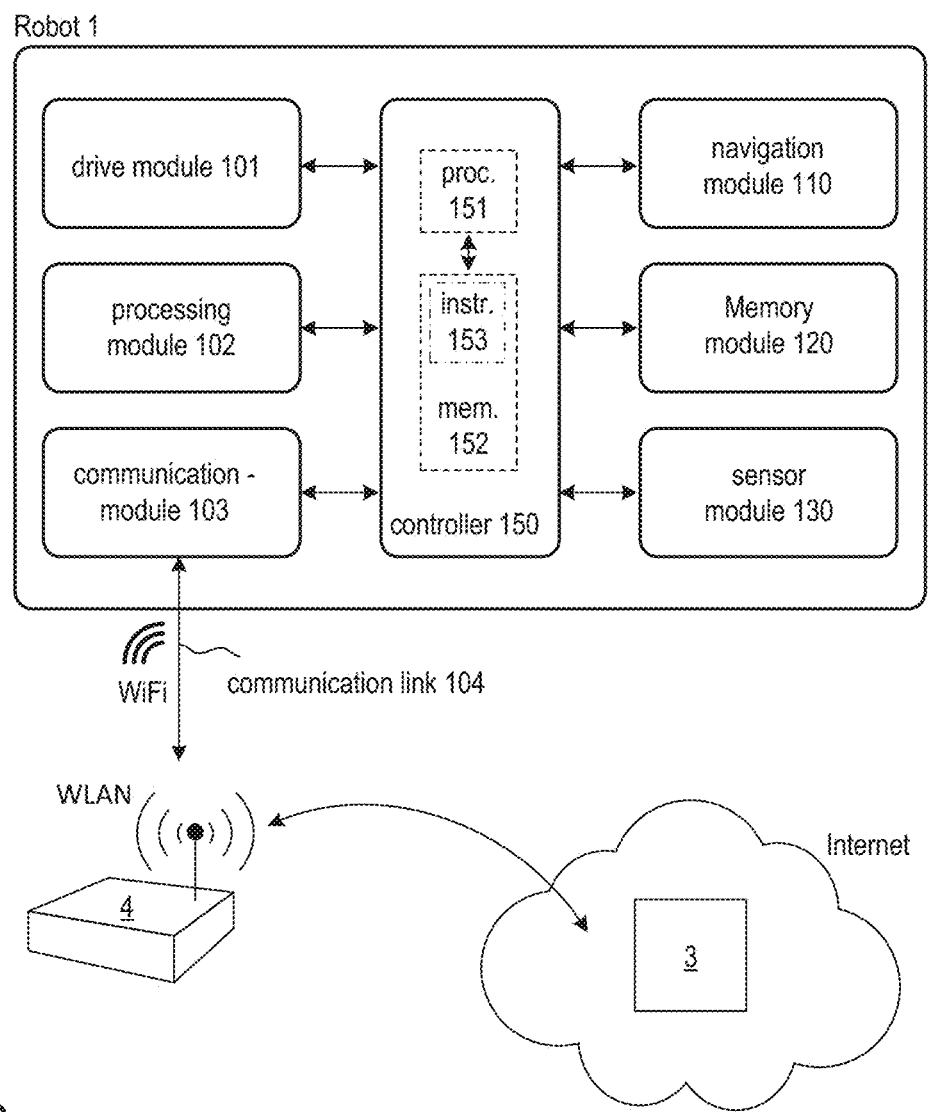
FIG. 9 is a block diagram illustrating the internal structure of a robot that is capable of performing the methods described herein.
Figure 10:
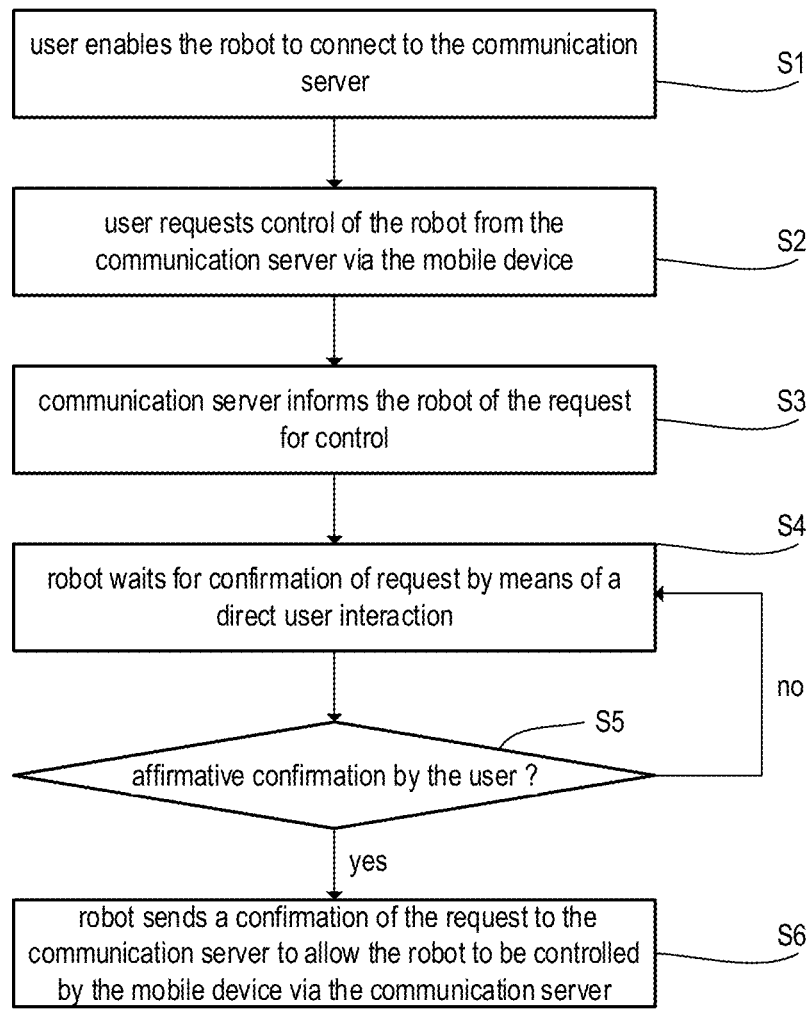
FIG. 10 is a flow chart illustrating a method disclosed herein.

FIG. 9 illustrates in a block diagram an exemplary structure of an autonomous mobile robot system with robot 1. The robot 1 may be a service robot and is capable of autonomously performing one or more tasks as described with regard to the embodiments discussed above. These tasks may be, e.g., cleaning or monitoring (surveillance) of an apartment (or any other premises) or the transport of objects within an apartment (or any other premises). As shown in the example of FIG. 9, the robot 1 includes various modules. In this regard, a module may be an individual sub-assembly (hardware), a software component for controlling the behavior of the robot that performs a desired task in the area of robot deployment, of a combination of both (e.g. dedicated hardware with connected peripheral devices and suitable software/firmware). The software responsible for the behavior of the robot 1 may be executed by the controller 150 (control module) of the robot 100. For this purpose the controller 150 may include a data processing device including one or more processors 151 or processor cores as well as a machine readable medium, such as memory 152 (e.g. random access memory or any other volatile or non-volatile memory) which, at least during operation, includes software instructions 153 that, when executed by the processor 152 of the controller 150, cause the robot to perform the activities as described with regard to the embodiments discussed above. The software execution may be at least partly "outsourced" to an external data processing device that is connected to the robot 1 via a communication module 103 and a communication link 104. The external data processing device may be a personal computer, a workstation, a server connecting to the internet (e.g. providing a cloud computing service such as server 3), etc., and connected to the robot 1, for example, via a local computer network or the internet. In the present example, the server 3 is connected to the robot 1 via a WLAN, e.g. via the router 4, which has a wireless access point. At this point it is mentioned that the "intelligence" of the robot may also be distributed across different modules of the robot and need not to be concentrated in the controller 150 (e.g. controller 150, navigation module 110 and sensor module 130). Some method steps may be implemented by two or more modules cooperating or two or more modules performing different partial steps of a method. When a specific method step is performed "by the robot", not necessarily all steps need be performed by the hardware and software included in the robot, rather some or all steps, or parts thereof, may also be performed using the external data processing device which is coupled to the robot 1 via the communication link 104. Notably, the operative features and functionality provided by the above robots, systems and methods may increase the efficiency of processing devices that are being utilized to facilitate the functionality provided by the robots, systems and methods. Such efficiencies can include that less processing power may need to be utilized because the processors and memories do not need to perform actions, operations, and analyses that have already been conducted. As a result, the functionality provided by the robots, systems and methods may provide substantial savings in the usage of processing resources by utilizing the software and functionality provided in the present disclosure. In other instance, the robots, systems and methods may provide for reduced communications, bandwidth and connectivity requirements.

In the present example, the robot 1 includes a drive module 101 that, for example, includes electric motors, gears and wheels. It may further include a power source and power electronics used to drive the robot's drive train. The drive module 101 enables the robot to—theoretically—reach any point within the area of robot employment. As mentioned, robot 1 may have access to a communication link 104 via communication module 103 that may include an interface to a local computer network (WiFi, ZigBee, etc.), the internet or to a point-to point wireless link (e.g. Bluetooth) or any other suitable communication means. In the depicted example, the robot 1 is registered with a wireless access point included in the home router 4. Further, the processors and memories may be utilized to optimize the usage of computing resources, power resources and/or connectivity while executing the operations conducted by the robot. As a result, such features provide substantial operational efficiencies and improvements over existing technologies.

As many common service robots, the robot 1 may further include a processing module 102 that may be, for example, a cleaning module configured to clean the floor. The cleaning module my include brushes, a vacuum unit or the like. In order to be able to perform a task autonomously, the robot 1 may have a navigation module 110, with which the robot may orient itself and navigate across the robot deployment area using so-called navigation features, i.e. features, with which the robot 1 may orient itself in its environment, such as landmarks (furniture, doorways, corners or a room, walls, etc) that may be detected by the robot 1 using its sensor module 130. The navigation module 110 may, for example, employ an obstacle avoidance strategy and/or a SLAM (simultaneous localization and mapping) algorithm in connection with one or more electronic maps of the robot deployment area. Various suitable algorithms are as such known and thus not further discussed herein. The map(s) of the area of robot employment may be newly generated by the robot during a deployment (e.g. while performing a task). Alternatively, a previously stored map may be used during a deployment. The stored map may have been generated by the robot itself during a preceding deployment or provided by the user or by another robot. The memory module 120 may include a non-volatile memory (e.g. a solid state disc, SSD) and may contain the maps of the area of robot employment. Alternatively, the maps may be stored externally, e.g. in or by the external data processing device (e.g. in a computer located in the apartment or by a cloud server such as the server 3).

The sensor module 130 may include one or more sensors for measuring distances to objects in the robot's environment such as optical sensors, acoustic sensors which operate using as such known triangulation or time-of-flight measurement (e.g. triangulation sensor, time-of-flight camera, laser range finder, ultrasonic sensors, etc.). Other suitable sensors may be cameras (in connection with image processing techniques), tactile sensors, gyroscopic sensors, inertial measurement units (IMUs), odometers and/or floor clearance sensors. Various suitable sensors are as such known and used in currently available autonomous robots and thus not further discussed herein.

While the machine-readable medium is shown in an example embodiment to be a single medium of memory 152, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The term "machine-readable medium" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated exemplary implementations of the present application.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A system comprising:
an autonomous mobile robot;
a mobile device;
at least one communication server that has access to a public internet,
wherein the autonomous mobile robot and the mobile device are configured to communicate via a first connection and a second connection, wherein the first connection is an indirect connection in which the communication server relays a communication between the autonomous mobile robot and the mobile device, and the second connection is a local wireless connection provided by a local wireless network; and
wherein, the system is configured to determine information about a current location of a user and, dependent on a distance between the autonomous mobile robot and the user, decide whether,
data should be sent to the mobile device and activity is carried out, altered, interrupted, continued or ended by the autonomous mobile robot,
wherein the information about the current location of the user is determined by determining information about a current location of the mobile device, and
wherein the autonomous mobile robot is configured to detect a state of certain objects and/or appliances in the area of the autonomous mobile robot employment and to send a message to the user when the user leaves, has left or is about to leave the area of the autonomous mobile robot employment and when a certain state of a certain object or appliance is detected.

2. The system of claim 1, wherein the system is configured to determine, based on the determined information about the current location of the user, whether the user is in the vicinity of the area of the autonomous mobile robot employment or not.

3. The system of claim 2, wherein, in event that the user is in the vicinity of the area of the autonomous mobile robot employment, different information is sent to the mobile device than in the event that the user is not in the vicinity of the area of autonomous mobile robot employment.

4. The system of claim 1, wherein the system is configured to prioritize an instruction based on from which connection the instruction is received.

5. The system of claim 1, wherein the decision which information is sent to the mobile device includes when to send the information to the mobile device.

6. The system of claim 1, wherein the system determines, based on whether communication via the second connection, which is the local wireless connection, is possible, whether the device is located in the area of employment of the autonomous mobile robot.

7. The system of claim 1, wherein the mobile device is configured to determine its own location, in the form of geographic coordinates, and to transmit the geographic coordinates to the autonomous mobile robot.

8. The system of claim 1, comprising at least one further device and wherein information about the location of each and every device is determined.

9. The system of claim 8, wherein, based on the information about the location of the mobile devices, the system determines which of the mobile devices is currently located in the area of the autonomous mobile robot employment or in its proximity, and
wherein the messages sent to the devices depend on whether they are located in the area of the autonomous mobile robot employment or in its proximity.

10. The system of claim 1, wherein the autonomous mobile robot is connected with other devices in the area of the autonomous mobile robot employment and can communicate with the other devices, and
wherein the autonomous mobile robot determines, based on whether the other devices inform the autonomous mobile robot of user activity, whether the user is present in the area of employment of the autonomous mobile robot.

11. The system of claim 1, wherein the autonomous mobile robot has sensors to detect obstacles, and
wherein the autonomous mobile robot determines, based on whether moving obstacles are detected, whether the user is present in the area of employment of the autonomous mobile robot.

12. The system of claim 1, wherein the autonomous mobile robot has a camera, and
wherein the autonomous mobile robot determines, based on whether a person or a certain person is detected on a photograph by image processing, whether the user or another person is present in the area of employment of the autonomous mobile robot.

13. The system of the claim 1, wherein the autonomous mobile robot is configured to detect, based on the information about the current location of the user, whether the user leaves or enters, has left or has entered or is about to leave or is entering the area of the autonomous mobile robot employment.

14. The system in accordance with claim 13, wherein the autonomous mobile robot is configured to detect certain objects in the area of the autonomous mobile robot employment and to send a message to the user when the user leaves, has left or is about to leave the area of the autonomous mobile robot employment and when an object has been detected.

15. The system of claim 1, wherein the autonomous mobile robot and/or the mobile device continuously or periodically searches for a local connection option and informs the user and/or the robot about a change of the connection, wherein the autonomous mobile robot and/or the mobile device is configured to react to a detected change.

16. The system of claim 1, wherein the data sent to the mobile device includes at least one of: information of the status of the autonomous mobile robot, information about an activity of the autonomous mobile robot, map information stored in or by the autonomous mobile robot, information concerning other objects detected by the autonomous mobile robot in an autonomous mobile robot employment area or a combination thereof.

17. The system of claim 1, wherein the data sent to the mobile device is sent via the first connection.

18. The system of claim 1, wherein the communication server is located outside of the local wireless network.

19. The system of claim 1, wherein the system is configured to determine information about the current location of the user based on whether the second connection is available.

* * * * *